US005380144A

United States Patent [19]

[11] Patent Number: 5,380,144

[45] Date of Patent: Jan. 10, 1995

Smith et al.

[54] DEPLOYABLE VEHICLE ACCESS RAMP

[75] Inventors: Bert R. Smith, Sun Lakes; Derold L. Kelley, Phoenix, both of Ariz.

[73] Assignee: Care Concepts, Inc., Phoenix, Ariz.

[21] Appl. No.: 119,953

[22] Filed: Sep. 10, 1993

[51] Int. Cl.[6] .............. B60P 1/00

[52] U.S. Cl. .............. 414/537; 14/71.3; 414/921; 414/522

[58] Field of Search .............. 414/537, 522, 921, 538; 14/71.1, 71.3

[56] References Cited

U.S. PATENT DOCUMENTS

| | | | |
|---|---|---|---|
| 3,984,014 | 10/1976 | Pohl | 414/921 |
| 4,068,770 | 1/1978 | Boehringer | 14/71.1 |
| 4,239,438 | 12/1980 | Everson | 414/538 |
| 4,252,491 | 2/1981 | Hock | 414/921 |
| 4,907,936 | 3/1990 | Bourdage | 414/921 |
| 5,160,236 | 11/1992 | Redding et al. | 414/537 |

*Primary Examiner*—Michael S. Huppert
*Assistant Examiner*—Thomas J. Brahan
*Attorney, Agent, or Firm*—Gregory J. Nelson

[57] ABSTRACT

An access ramp for a van or a similar vehicle having a housing below the vehicle floor and adjacent door which houses the ramp structure. A carrier is extendable and retractable and is mechanically linked to a ramp platform. A boom arm on the carrier extends when the carrier extends and guides a cable which is motor driven to lower and lift the platform. Lift cams elevate the inner end of the platform when the platform is extended to bring it into close proximity with the vehicle floor.

11 Claims, 4 Drawing Sheets

FIG. 3
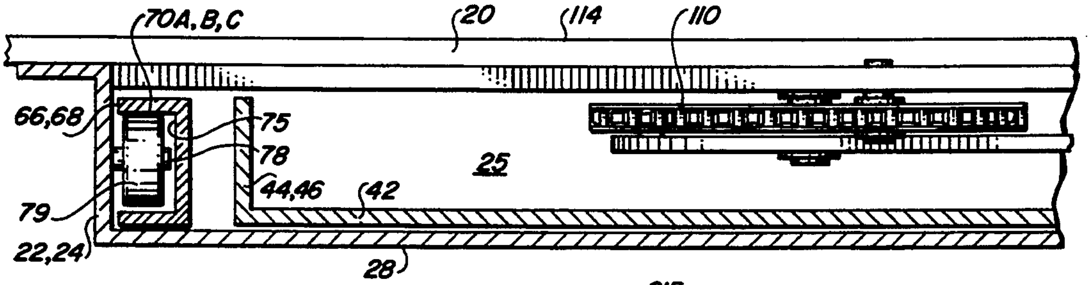
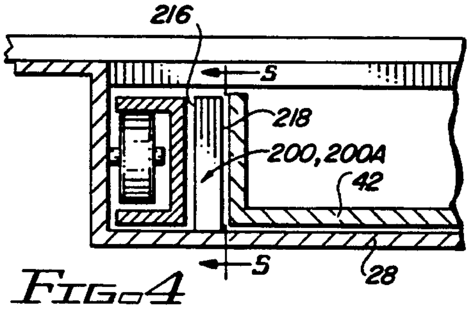
FIG. 4
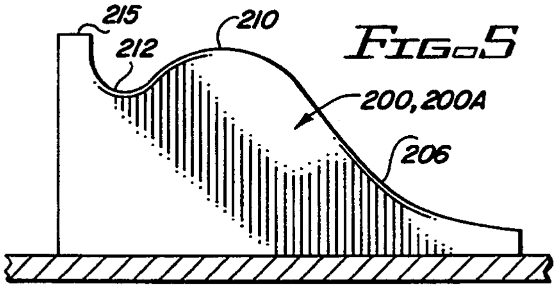
FIG. 5
FIG. 6
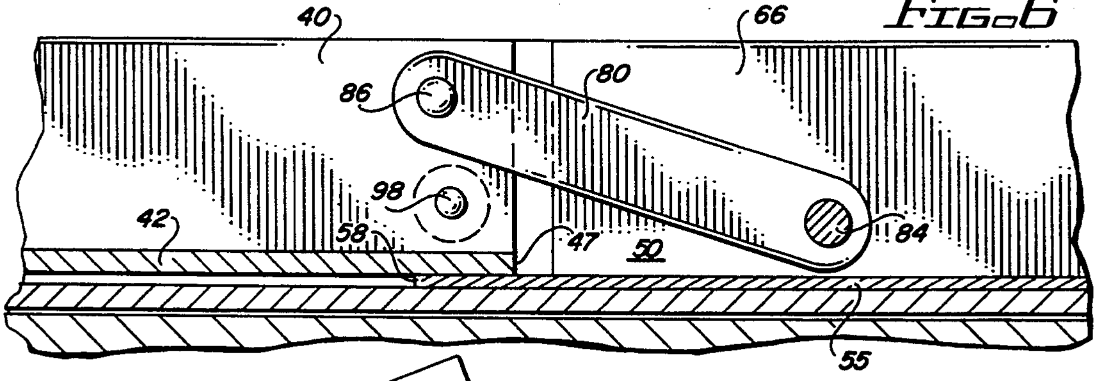
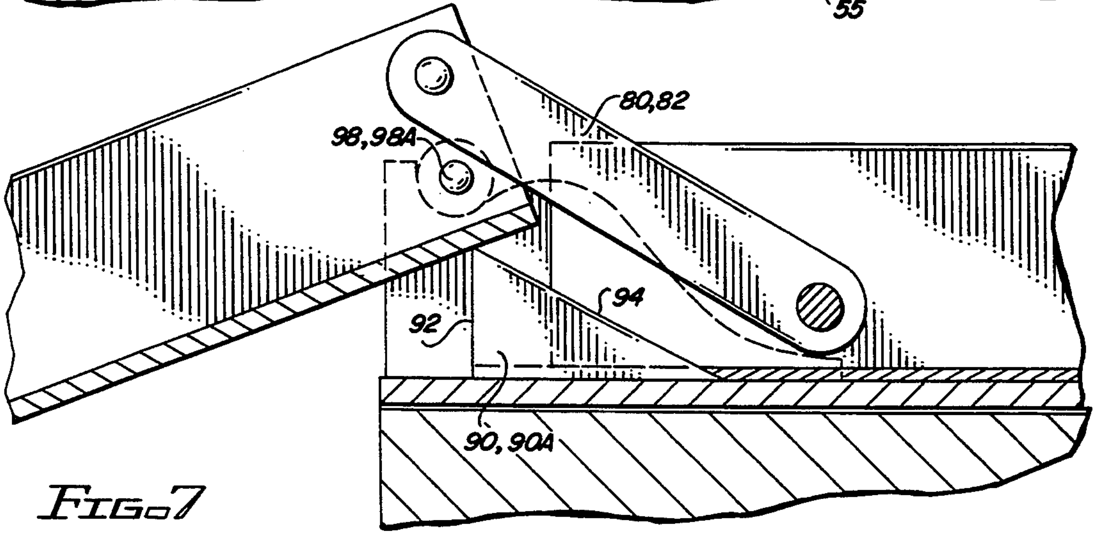
FIG. 7

DEPLOYABLE VEHICLE ACCESS RAMP

BACKGROUND OF THE INVENTION

1. Field of the Invention

The present invention relates to vehicle access ramps and more particularly relates to ramps which are deployable from a position in which the ramp is stored below the vehicle floor to an extended, inclined position to assist disabled persons entering and exiting the vehicle.

There is a recognized need for access ramps or platforms which will assist persons, particularly disabled persons, in entering and exiting motor vehicles, either as a passenger or as a driver. The Americans With Disabilities Act has as a stated objective the removal of physical obstacles to those with handicaps or disabilities. Because of the stated objectives of this legislation and an increased public awareness and concern of the requirements of the disabled, there has been more emphasis in providing systems which assist a wheelchair occupant or other disabled person a convenient and safe way of entering or leaving a motor vehicle. In many cases, once access to the vehicle is obtained, the person can operate the vehicle which may be provided with special operator controls.

2. Description of Related Art

Some of the earlier design efforts in this area include power-operated ramps to facilitate wheelchair passengers in entering and leaving public vehicles such as buses. U.S. Pat. No. 4,131,209 discloses a ramp for a motor bus which, when the door is opened, accommodates lateral outward extension of a ramp from a normally stowed position below the floor of the bus. A portion of the ramp adjacent its outer end serves as a step for entering the bus when the ramp is in the stowed position. The device is powered by a motorized lead screw. When extended, the ramp moves outwardly through the entranceway and automatically tilts upwardly towards its inner end to provide an inclined platform from the sidewalk or roadway to the vehicle. A further improvement to this ramp is shown in U.S. Pat. No. 4,685,858.

U. S. Pat. No. 4,479,753 discloses another approach to the problem of providing accessibility to vehicles. A lift is shown which may be retrofit to a van which lift is hinged on a vertical axis to a door post adjacent the door hinge. A horizontal carrier allows the unit to slide to clear the vehicle structure and then a vertical carrier descends from the horizontal carrier powered by a hydraulic actuator. A folding platform then swings down on its horizontal hinge along the lower edge of the vertical carrier. In the deployed position, the platform is vertically moved on the vertical carrier and is subsequently stowed by swinging the platform vertically against the horizontal and vertical carriers so that the entire lift package when not deployed is conveniently stowable.

Another type of vehicle-mounted access ramp for a wheelchair user is shown in U.S. Pat. No. 3,874,527. In this patent, the vehicle door is modified to hinge about a horizontal axis along or below the lower edge of the door. The inner surface of the door is modified to provide a ramp surface. The door is raised and lowered by a power assembly. Approach ramp pivots along the normal upper door edge provides a smooth ramp surface from the ground to the inner door surface when the door is lowered.

U.S. Pat. No. 4,827,548 discloses an extendable and retractable ramp assembly for facilitating wheelchair passengers to and from a bus or van. The invention has an extendable and retractable ramp which includes a power actuating mechanism disposed in the vehicle which includes a track mechanism and roller elements mounted on the ramp which elevate the inner end of the ramp to the approximate level of the floor of the bus or van.

Further improvements in ramps of this type are found in U.S. Pat. No. 5,160,236 which ramp has been commercialized by the assignee of this application, Care Concepts, Inc., of Phoenix, Ariz. This patent shows a retractable van side door ramp which has a short base end section and a longer outer end section which are pivotally connected. The ramp assembly is mounted from the floor structure of the van and is extendable and retractable at the side of the van below the door opening. The ramp assembly is supported during a portion of the extension and the retraction and as the ramp approaches the fully extended position, the outer ramp platform pivots to a position on the ground or curb so as to not shovel. The reverse operation takes place during retraction. The ramp may be powered by various manual or mechanical drive arrangements including electric motors or cable and gear systems.

While the above patents as well as various patents disclosed therein disclose various systems for assisting disabled persons and persons confined to a wheelchair in entering and exiting a motor vehicle, there nevertheless exists a need for a simplified and efficient ramp which provides vehicle accessibility and which ramp complies with the requirements and spirit of the Americans With Disabilities Act.

SUMMARY OF THE INVENTION

Accordingly, it is a broad object of the present invention to provide a loading and unloading ramp for use in conjunction with a vehicle which has a ramp that is particularly suitable for use by disabled persons.

It is another object of the present invention to provide a retractable and deployable ramp structure which may be conveniently retrofit to existing vehicles, particularly side door minivans.

It is another object of the present invention to provide a ramp structure which is simple and efficient and which may be originally incorporated or retrofit into the body structure of the vehicle.

It is still another object of the present invention to provide a ramp which when deployed extends horizontally and having a mechanism which allows the ramp outer end to pivot downwardly at or near the end of the deployment cycle to provide a gradually inclined surface from the curb or roadway to the floor of the vehicle.

It is another object of the present invention to provide a ramp assembly design which simplifies the installation operations necessary.

It is another object of the present invention to provide an access ramp which is mounted beneath the floor structure of a side door van and is extendable and retractable at the side of the van immediately adjacent the floor of the van at the door opening.

Briefly, in accordance with the foregoing objects, a vehicle access ramp assembly is provided which assembly has a planar floor or platform for longitudinal extension and retraction from a stowed position in the van. The ramp assembly includes a housing positioned adjacent the vehicle door opening as, for example, below the floor of the van adjacent the side door. A carrier is extendable and retractable on rollers at opposite longitudinal sides of the housing structure. The carrier is mechanically connected to the ramp platform. The carrier has a boom arm which projects horizontally outwardly from the side of the vehicle when the ramp is extended. A reversible electric carrier drive motor is mounted to the housing in a fixed position and through a chain, cable, belt or rack/gear with mating pinion gear reversibly drives the carrier which, in turn, moves the ramp platform from a retracted to a deployed position and return. A second reversible electric lift motor is positioned on the carrier to move with the carrier. The lift motor operates a cable and at a predetermined location along the deployment and retraction cycle will either the pay-out cable or take-up the cable to selectively control the position the outer end of the ramp platform to permit it to swing downwardly to provide a gradually inclined surface to return the ramp to a substantially horizontal position for retraction and storage. Lift cams on the sides of the ramp platform elevate the inner end of the ramp platform to bring it into close proximity to a transition plate attached to the vehicle floor when the ramp is fully deployed. Braces on the carrier move into a supporting position beneath the inner end of the ramp platform when the ramp platform is deployed to reinforce the ramp.

The assembly includes an operational control system which includes electrical switches positioned to control the operation of the carrier drive motor and the lift motor during the extension and retraction operations. Provision is also made to permit manual operation of the ramp.

BRIEF DESCRIPTION OF THE DRAWINGS

The above and other objects and advantages of the present invention will become more apparent from the details of construction and operation as more fully set forth in the following description and drawings in which:

FIG. 3 is a sectional view taken along line 3—3 of FIG. 2;

FIG. 4 is a sectional view taken along line 4—4 of FIG. 2;

FIG. 5 is a sectional view taken along line 5—5 of FIG. 4;

FIG. 6 is a detail view showing the link connection between the carrier and the ramp platform;

FIG. 7 is a detail view similar to FIG. 6 of the end of the carrier and showing the inner end of the ramp platform in an elevated position;

DESCRIPTION OF THE PREFERRED EMBODIMENTS

Figure 1:
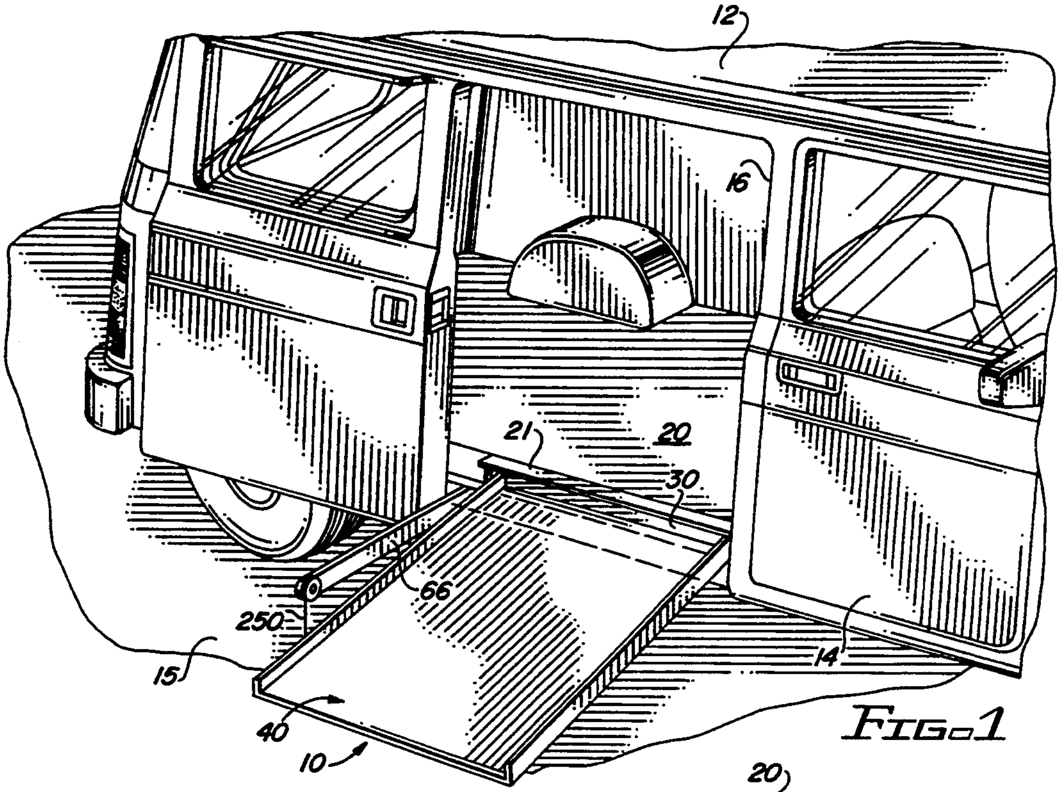
FIG. 1 is a perspective view of a representative model of vehicle of the type commonly designated a minivan shown with the side door open and the access ramp of the present invention deployed.
Figure 8A:
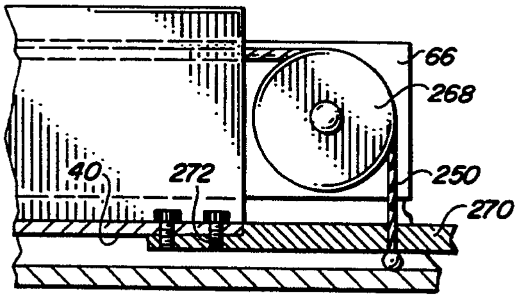
FIGS. 8*a* and 8*b* are detail views showing the attachment of the boom to the ramp and the manually operable emergency release.
Figure 8B:
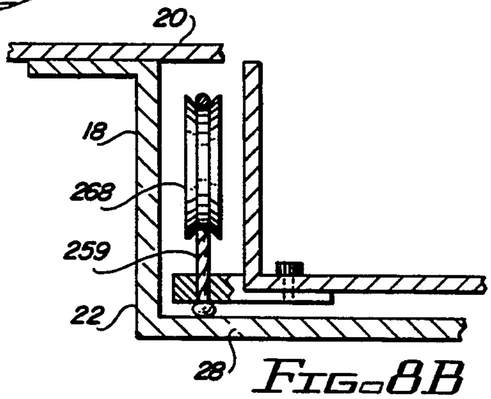

Turning now to the drawings, the ramp assembly is generally designated by the numeral 10 and in FIG. 1 is shown in a deployed position in conjunction with a vehicle 12 which vehicle is representative of the type of vehicle generally designated as a minivan such as those manufactured by Chrysler Corporation under the model designation Caravan, and Town and Country Voyager. It is to be understood that the ramp assembly 10 may be employed or adapted to various types and models of vehicles of various manufacturers including vans and buses to permit persons, particularly disabled persons convenient entry and egress from the vehicle. The vehicle 12 is shown as having side door 14 which is shown in the open position so a person can conveniently enter and leave the van through side opening 16. In the deployed position, the ramp assembly of the present invention provides a ramp platform 40 which serves as a bridge from the roadway 15 on which a person may either walk or on which a wheelchair or motorized cart may be driven to access the vehicle. The ramp is designed in accordance with the provisions of the American Disabilities Act (ADA) which specifies a maximum one-to-four rise or incline of the ramp platform, a minimum width of 30", minimum 2" high side rails and a load capacity, of 600# with a safety factor of at least 3 based on the ultimate strength of the material.

The ramp assembly is disposed within a box-like housing structure 18 which is normally positioned beneath the floor or deck 20 of the van at a location aligned with the door opening 16 so that in the deployed position, the ramp platform 40 extends from an opening 30 at the lower portion of the door opening as shown in FIG. 1. A transition plate 21 may be provided at the edge of the floor 20. Once the person enters the interior of the vehicle by means of the ramp, the person may either assume a position as a passenger at the rear of the van or may be seated at the steering wheel in a position to operate the van. Many persons confined to a wheelchair operate motor vehicles and often vans are modified and equipped so that the wheelchair may be positioned and locked behind the steering wheel in the normal vehicle operator's position. Special operator controls may also be provided.

Figures 2, 9, 10:
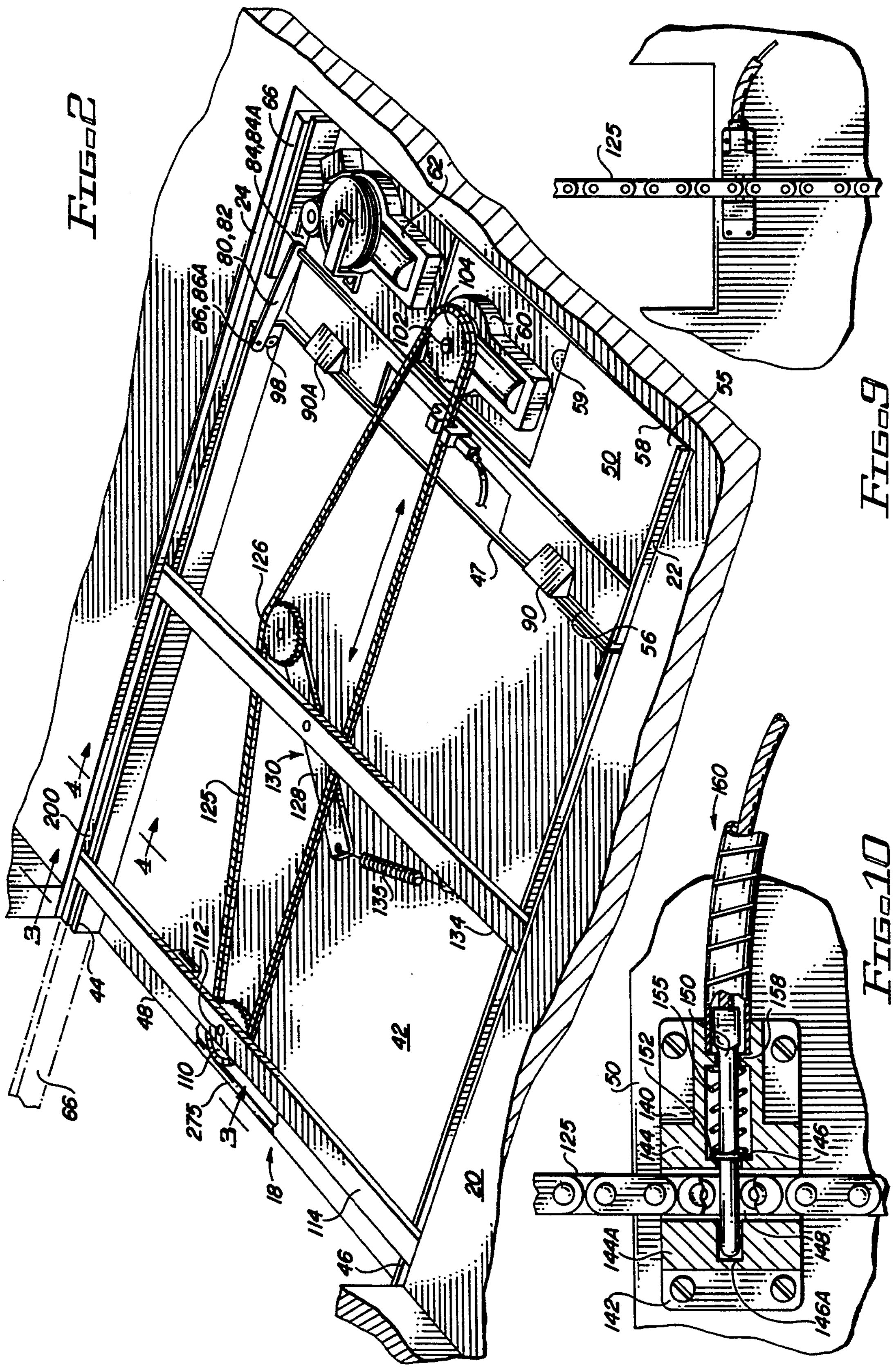
FIG. 2 is a perspective view of the ramp assembly shown in the installed position with a portion of the vehicle floor broken away for clarity.
FIGS. 9 and 10 are detail views showing the connection of the channel to the carrier and the manually operable emergency release.

Turning now to the drawings, particularly FIGS. 2 to 6, the ramp assembly 10 is shown in greater detail. FIG. 2 shows the ramp assembly mounted in the vehicle with a portion of the vehicle floor 20 removed to better reveal the ramp structure. In the normal installed position, the floor 20 of the vehicle extends as a cover for the ramp assembly so that it is in a concealed and out-of-the-way position.

The ramp assembly is mounted within a box-like housing structure 18 which is preferably attached to the vehicle and vehicle frame below the floor 20. The ramp assembly may be provided as an OEM component of the manufactured vehicle or retrofit by appropriate modifications in a manner which will not detrimentally effect the structural integrity of the vehicle body and chassis. The housing has opposite side walls 22 and 24 which are preferably structural Z-members having an upper leg attached to the underside of the floor 20. A vertical wall 25 extends between the end of the Z-sections 22 and 24 at the inner end of the housing. For purposes of orientation, the term "outer" refers to the area of the ramp assembly disposed adjacent the door opening 16 and the terms "inner" or "rear" refer to the area at the opposite end of the ramp assembly. A panel of sheet steel extends between the lower legs of the Z-section and defines the bottom 28 of the housing. Opening 30 is defined at the front of the ramp assembly which opening is disposed immediately subjacent the edge of the floor 20 at the door opening 16 of the vehicle. When the vehicle door is closed, the opening 30 is concealed by the vehicle door. Transition plate 21 angles downwardly from the edge of the vehicle floor 20 to extend in close relationship with the ramp platform 40.

As indicated above, the ramp assembly includes a ramp or platform 40 which is slidable with respect to the housing 18 and in the retracted position is fully contained within the housing beneath the floor of the vehicle in an out-of-the way position. In the extended or deployed position, the ramp platform extends outwardly providing an inclined bridge surface extending from the road surface or curb 15 to the floor of the van.

The ramp platform 40 has a generally horizontal floor 42 with integrally formed upstanding flanges 44 and 46 positioned at the opposite sides of the ramp. The flanges 44 and 46 are spaced inwardly from the opposite sides of the vertical sides of the housing 22 and 24. Platform 40 has inner edge 47 and outer edge 48 which extend transversely between the flanges.

Retraction and extension or deployment movement is imparted to the ramp by means of a carrier 50 which is powered by drive motor 60 secured to the housing floor 28. The carrier 50 has a transversely extending bottom plate 55 having a front edge 56 and a rear edge 58. A recess 59 is provided in the rear edge 58 of the carrier plate. A lift motor 62 is mounted on the carrier plate 55 adjacent the forwardly extending boom arm 66. Another boom arm 68 extends forwardly from the opposite side of the carrier. Boom arms 66 and 68 are similar in construction, although boom arm 66 is longer so that when the ramp platform is in the fully deployed position, the boom arm 68 extends outwardly from the side of the vehicle at least part way above the ramp platform as seen in FIG. 1. For example, ramp platform 40 may be typically 4′ in length so that in the forward, fully deployed position, boom arm 66 extends approximately 2′ to 3′ from the side of the van. Boom arm 68 in the deployed position extends only to the approximate edge of the vehicle chassis.

The carrier 50 is guided along its path of movement by the boom arms 66 and 68. Each of the boom arms 66, 68 has a channel configuration as shown in FIG. 3. The boom arms each define longitudinally extending slots which are disposed toward the adjacent side walls of the housing which slots each define a track 75. A plurality of roller assemblies 70A, 70B and 70C are disposed at spaced-apart locations along the opposite side wall 22 of the housing. Each of the roller assemblies has a cylindrical wheel 79 rotatable about an axle 78 which is fixed to the housing side walls 22. The wheels 79 are received within the tracks 75 in the boom arm 66.

A plurality of similarly constructed roller assemblies 72A, 72B, and 72C are provided at spaced-apart locations along side wall 24 and are received within the longitudinal track extending along boom arm 68. Thus, as the carrier moves in and out, the travel of the carrier is smoothly guided by one or more pairs of the wheels 70, 72, etc. When the ramp platform is fully retracted, all wheels are positioned within the track 75 in the boom arms and as the ramp is deployed, the carrier passes along the roller assemblies and in the fully extended position, the boom arms clear the roller assemblies, The carrier 50 drives the ramp platform and is mechanically connected to the ramp platform 40 at opposite sides of the carrier by means of a pair of links 80 and 82. Link 80 interconnects the carrier 50 and ramp platform 40 at the aft side of the ramp platform and link 82 connects the carrier and platform at the forward side of the assembly. The terms "forward" and "aft" are used with respect to the normal vehicle orientation and travel. Link 80 is pivotally connected to flange 44 at pivot point 84. The opposite end of link 80 is pivotally connected to the rear of the ramp assembly at pivot point 86 which is located adjacent the upper edge of the ramp wall 46 near the rear of the ramp. Link 82 is similarly positioned extending between pivot point 84A on the inner side of boom arm 68 and pivot point 86A disposed on side wall 44 of ramp platform 40.

In the retracted position and during a substantial portion along the deployment path of the ramp, a portion of the ramp floor along edge 47 of the ramp platform overlaps the forward edge 58 of the carrier assembly as seen in FIGS. 6 and 7. A predetermined gap (Δ) is maintained between the inner edge 47 of the ramp assembly and braces 90 and 90A. Braces 90 and 90A are welded or otherwise secured to the upper surface of the carrier plate and each has a vertical front wall 92 and a rearwardly extending angular brace member 94. The overall height of front wall 92 is approximately half the height of the side walls of the ramp platform. The brace members 90 and 90A serve to reinforce the inner end of the ramp platform when the ramp is deployed as seen in FIG. 7 and will be more fully explained hereafter.

A roller 98 is rotatable about a horizontally extending axis which extends inwardly from ramp side wall 44 vertically aligned and below pivot 86. A roller 98A is similarly positioned on the inner side of the opposite ramp side wall 46.

The ramp assembly drive system imparts linear motion to the carrier which through the links 80 and 82 transmit motion to the ramp platform 40 to cause the ramp to deploy and retract. The drive assembly consists of an electric drive motor which may be a conventional reversible window lift motor of the type commercially available from various manufacturers. The motor is secured to the floor 28 of the housing 18 at a rear location so that when the carrier is fully retracted, the motor is positioned within the recess 59 at the rear of the carrier. As seen in FIG. 2, the carrier drive motor has a vertically extending output shaft 102 on which is fixed gear sprocket 104. An idler gear 110 is rotatively disposed on a shaft 112 which depends from stringer member 114 located toward the outer end of the ramp assembly extending transversely between the opposite side walls 22 and 24 of the housing 18.

A continuous drive chain 125, shown as a bicycle or pintle-type chain, extends around the driven gear sprocket 104 and the idler sprocket 110. A chain tensioning device 130 maintains the proper tension on chain 125 by applying a tensioning force to a section of the chain extending between the sprockets. The chain tensioning device 130 consists of an idler sprocket 126 rotatably mounted on the outer end of arm 128. Arm 128 is pivotally mounted at an intermediate location to cross member 134 extending transversely between the side walls of the ramp assembly pan. The opposite end of arm 128 is attached to one end of a tensioning spring 135 which has its opposite end secured to axially extending cross member 134. Thus, it will be seen that as the carrier 50 traverses inwardly and outwardly, the tensioning device 130 will maintain the proper tension of the chain. Although a chain is shown as a preferred power transmitting means, other equivalent means such as cables or belts may be used.

The carrier 50 is attached to the straight section of chain 125 extending between the drive sprocket 104 and idler sprocket 110. As best seen in FIGS. 2, 9 and 10, the chain 125 is secured to the carrier by means of a pair of oppositely disposed pick-up brackets 140 and 142 which have upstanding legs 144, 144A, respectively, which define elongated slots 146 and 146A, respectively. The slots 146 and 146A are aligned with an aperture 148 in a selected one of the chain links of chain 125. A pin 150 extends through the aperture 148 and slots and 146, 146A. Thus, the motion of the chain in both axial directions will be transmitted to the carrier by means of the pick-up brackets.

The ramp assembly also has provision for manual operation of the ramp in the event of electrical power failure. To this end, the pin 150 is provided with a washer 152 which bears against the upstanding leg of bracket 146. A spring 155 extends around the pin and has one end engaging the washer 152 and the opposite end engaging fixed stop plate 158 which is spaced from bracket 146. The distal end of the pin is secured to a cable assembly 160, the opposite end of which is positioned for convenient access, as for example at the side of the housing at the outer edge of the ramp assembly. It will be apparent that by exerting a manual traction or pulling force on the cable assembly 160, the pin 150 will be disengaged from the chain allowing the ramp to be manually moved bi-directionally along the guide track in the boom arms.

The ramp assembly of the present invention also includes provision for elevating the rear end of the ramp platform when the ramp platform is in the fully deployed position. The elevation of the inner end of the ramp platform places it closer to the vehicle floor 20 and the floor transition plate 28 for added safety and convenience. To elevate the rear end of the ramp platform, lift cams 200 and 200A are interposed between the ramp platform sides 44 and 46 and the boom arms 66 and 68, respectively, at a location immediately adjacent the outer or open end of the ramp. Cam 200 is representative and is best seen in FIGS. 4, 5 and 6 and has a gradual rise 206 which extends to peak 210 and thereafter continues downwardly into a detent recess 212. The outer surface of each of the cams is vertical and terminates at a stop 215 forward of the detent 212. The cam has opposite planar sides 216 and 218 and is cut or fabricated from suitable steel material and is interposed between the boom and ramp in a vertical position.

During the major portion of the deployment and retraction of the ramp, the ramp assembly operates with the floor 42 of the ramp engaging or sliding along or adjacent the upper surface of the floor 28 of the housing and supported on transverse roller 275 at the outer edge of the housing. During the deployment, as the ramp nears the fully extended position with a substantial portion of the ramp extending outwardly from the opening in the housing, the rollers 98 and 98A will initially engage the rise portion 206 of respective lift cams 200 and 200A. As this occurs, the rollers will ascend the rise of the cams causing the inner end of the ramp to elevate as best seen in FIG. 7. This motion is permitted by the links 80, 82 interconnecting the carrier and the ramp assembly. As the ramp moves to a position where the associated rollers 98 and 98A pass the peaks 210 of the associated cams, the rollers will descend into the detent area 212 of the cam. Further movement of the ramp is prevented by stops 215. The carrier 50 is permitted slight further forward movement which will cause the supports 90, 90A which are mounted to the carrier to continue to move outward as the ramp is pivoted to the position shown in FIG. 6. As this occurs, the carrier and supports 90, 90A move under the ramp floor 42 adjacent the inner end of the ramp to provide support and reinforcement for the ramp at this location. The supports 90, 90A serve to resist transverse flexing of the ramp under load giving the ramp greater stability.

When the carrier drive motor 60 is reversed, the chain will pull the carrier rearwardly moving the ramp platform 40 rearwardly by means of the associated links 80, 82 from the deployed position. The ramp platform 40 will move from a position seated in cam detents and progress downwardly along the cam surfaces until the ramp floor is positioned in sliding engagement with the upper surface of the floor of the housing. Continued retraction will bring the ramp to the position shown in FIG. 1.

Another important functional feature of the present invention is the provision of controlled lowering and raising of the outer end of the ramp platform. During the retraction operation, the ramp is first raised to a substantially horizontal position before or at the beginning of retraction of the ramp into the retaining housing by means of the drive motor. During deployment, the ramp is partially or fully extended and then the outer end of the ramp lowered until it assumes a position resting on the ground or curb which provides an inclined surface for traffic.

Accordingly, referring to FIGS. 2, 7, 8 and 11, a ramp lift motor 62, as has been described, is mounted on the carrier 50 and traverses during deployment and retraction with the carrier. The lift motor is of the type described above which may be a reversible electric motor of the type conventionally used as window riser motors. Motor 62 is provided with a vertically extending output shaft 225 which carries a rotor 230 onto which a cable 250 is wound. The cable 250 extends from the rotor 230 around an idler 260 positioned adjacent the rotor. A generally C-shaped cable guard 265 is associated with the idler 260. The cable 250 is directed along the boom arm 66 and extends around a pulley 268 mounted at the outer end of the boom arm 66. The cable extends downwardly from the pulley and is secured to the underside of the ramp platform 40 at clevis 270. Clevis 270 is pinned to the underside of the ramp at pins 272. A section of the clevis projects outwardly beyond the end of the ramp as seen in FIG. 7. In the normal operation, when the cable is extended, the weight of the ramp platform will cause the ramp to pivot and drop to an inclined position. In the event it is necessary to operate the device manually in an emergency situation, such as in the event of a vehicle electrical failure, clevis 270 may be removed by detaching clevis pins 272 and the ramp lowered manually.

Figure 11:
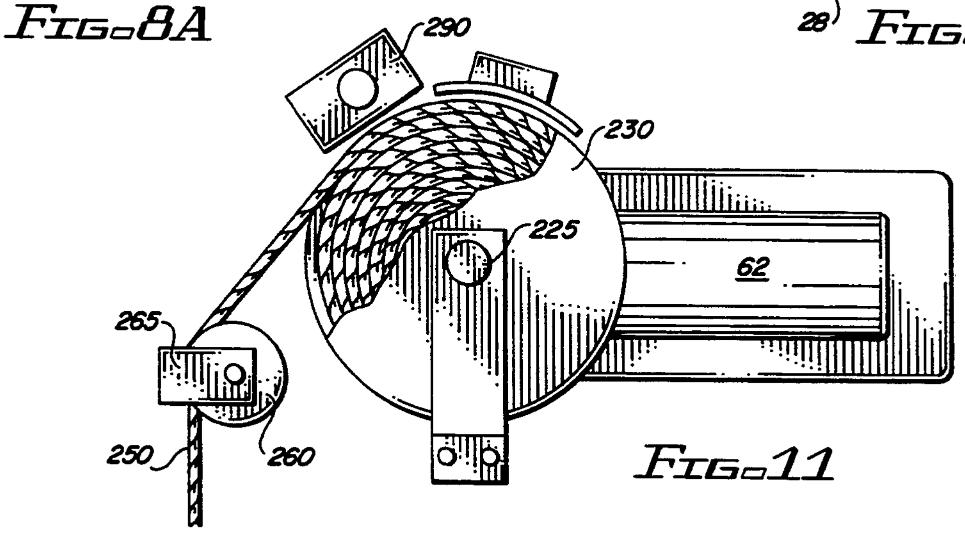
FIG. 11 is a plan view of the lift motor.

In the normal motorized operation, lowering of the ramp is controlled by the lift motor 62 which is a window lift motor of the type described above. When the lift motor is actuated and the ramp is fully extended, the cable will pay-out allowing the end of the ramp to drop to the curb or ground. A grounding post 290 is positioned adjacent the rotor as best seen in FIG. 11. When the end of the ramp engages the ground, the rotor 23(I will continue to rotate paying out cable causing the cable to become slack. The slack cable will engage the grounding post which operates upon a relay to switch the power off.

Figure 12:
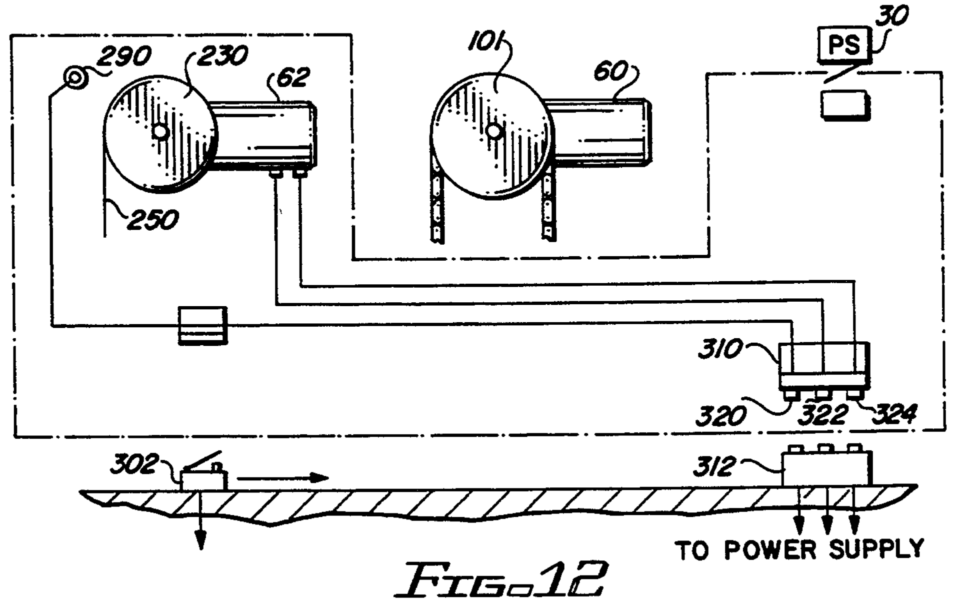
FIG. 12 is a plan view of the carrier schematically showing the associated electrical components.
Figure 13:
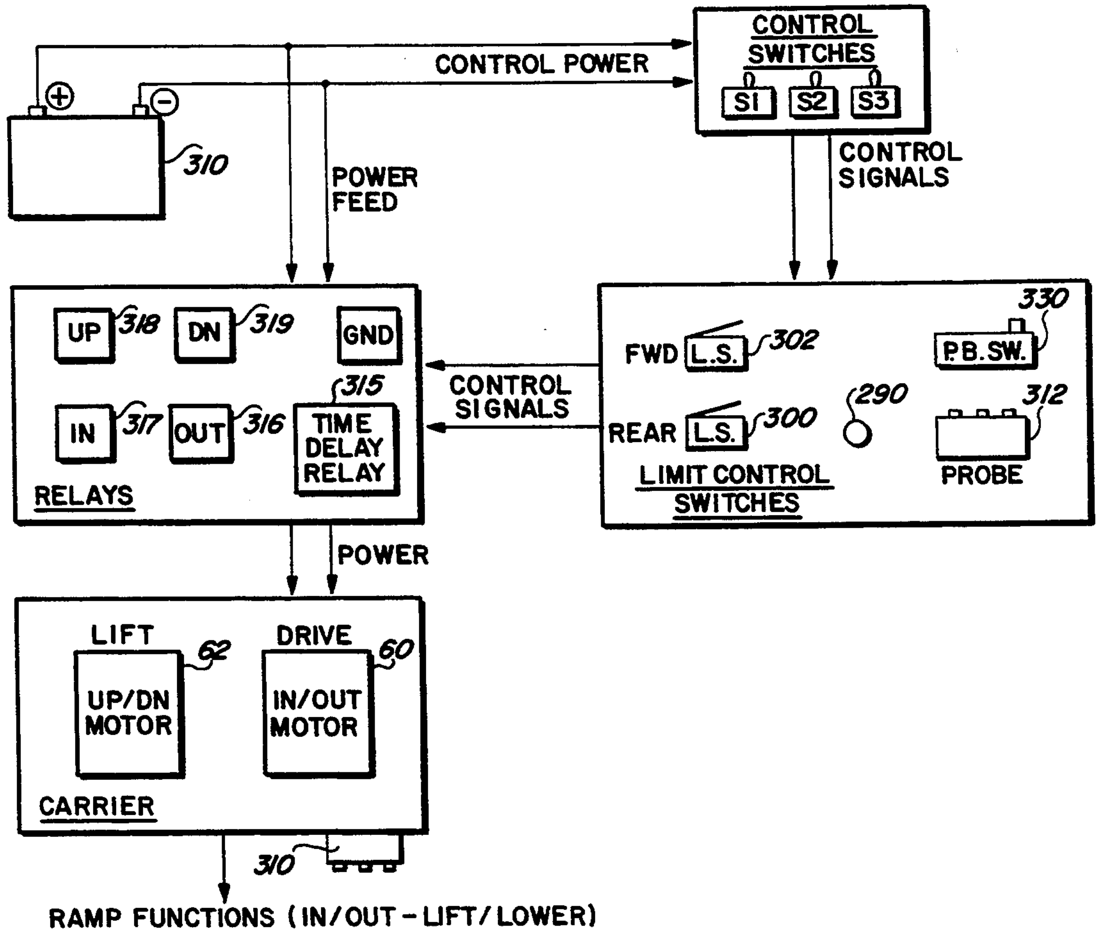
FIG. 13 is a schematic of the electrical control system.

The electrical system of the present invention is shown in FIGS. 12 and 13. Drive motor 60 is stationary and lift motor 62 moves with the carrier. The system operates from the electrical system of the vehicle represented by battery 310.

The operation of the system is initiated by any one of three switches $S_1$, $S_2$ or $S_3$ located on or in the vehicle. For example, switch $S_1$ is located on the vehicle instrument panel, switch $S_2$ in the rear passenger compartment and switch $S_3$ at an exterior location, as for example at or near the rear of the vehicle in an area rearward of door 14. A push button switch 330 is positioned to be closed only when door 14 is open. Refer 1o FIG. 1. Limit switch 300 is closed when the carrier and ramp are fully retracted and limited switch 302 is closed when the carrier and ramp are fully deployed.

When one of the switches $S_1$, $S_2$ or $S_3$ is depressed, the door 14 is opened by a separate power mechanism. The opening of door 14 releases push button switch 330 and allows relay 316 to be energized sending power to drive motor 60. The ramp and carrier deploy and at or near full deployment limit switch 302 is contacted and closed which terminates power to the drive motor. At full deployment, the contacts of switch 310 on the carrier engage the matching contacts of fixed switch 312. This actuates the down relay 319 sending power to lift motor 62 causing cable to pay out. The cable continues to pay out until the ramp engages the ground surface causing the cable to become slack engaging the grounding post terminating power to motor 62.

The retraction cycle operates in a similar fashion. Any of the switches $S_1$, $S_2$ or $S_3$ is actuated. Power is directed to the time delay relay 315 and to the "up" relay 318 causing motor 62 to operate in a direction to wind up cable to lift the ramp to a horizontal position. A clutch prevents overwinding of the cable.

After a predetermined time delay, the "in" relay 317 is energized which directs power to motor 60 causing the carrier and ramp to move inwardly. This terminates the contact between switch elements 310 and 312 and de-energizes the lift motor 62. The carrier moves inwardly with the ramp until limit switch 300 is engaged which turns off power to the "in" relay 317 and to the drive motor 60.

Thus, it will be seen that the present invention provides a unique and efficient ramp assembly for vehicle access. It will be obvious to those skilled in the art to make various changes, alterations and modifications to the deployable vehicle access ramp described herein. To the extent such changes, alterations and modifications do not depart from the spirit and scope of the appended claims, they are intended to be encompassed therein.

We claim:

1. An access ramp assembly for a vehicle having a floor and a door for accessing such vehicle, said ramp assembly comprising:

(a) a housing mountable adjacent the vehicle floor;

(b) a platform having a front and a rear and slidable within said housing between a retracted to a deployed position in which the platform extends from the vehicle;

(c) a carrier secured to the rear of said platform and carrying a boom member which extends outwardly of the vehicle when said ramp is deployed;

(d) drive means for driving said carrier to move said platform between said retracted and deployed positions;

(e) guide means for guiding The sliding movement of said platform and carrier; and (f) lift means for selectively raising and lowering the front of said platform, said lift means including a cable extending between said boom member and platform and selectively operable pulley means operable to pay out cable when the platform reaches a predetermined deployed position to lower the front edge of said platform to provide an inclined support surface and selectively operable to take-up cable to raise said platform to a substantially horizontal position to permit said platform to be moved to said retracted position.

2. The access ramp of claim 1 wherein said platform and carrier are interconnected by at least one mechanical link.

3. The access ramp of claim 1 wherein said drive means includes an electric drive motor connected to an electrical circuit, said drive motor having an output shaft carrying a sprocket and second sprocket means displaced from said first sprocket and a drive chain extending therebetween, said carrier having attachment means connecting said carrier to said chain.

4. The access ramp of claim 3 further including chain tightener means including a third sprocket engaging said chain and means biasing said sprocket into engagement with said chain.

5. The ramp of claim 3 wherein said electrical circuit is connected to the electrical circuit of the vehicle and said circuit includes operating switches located both interiorly and exteriorly of the vehicle.

6. The access ramp of claim 1 when said lift means including an electric lift motor connected to an electrical circuit and further including a grounding post in the said electrical circuit providing power to said lift motor wherein a predetermined slackening of said cable will cause said cable to engage said ground post interrupting said lift motor electrical circuit.

7. The access ramp of claim 1 further including brace means on said carrier and further including cam means associated with said housing positioned to be engaged by said platform as said platform is deployed to lift the rear of said platform, to position said brace means below the rear of said platform to support the same.

8. The access ramp of claim 1 wherein said guide means comprise track means extending longitudinally along said boom member and a plurality of bearing means in said track.

9. The access ramp of claim 1 further including manually operable means for detaching said carrier from said cable and said boom from said ramp to permit manual extension and deployment of the, platform.

10. The access ramp of claim 1 wherein said housing is disposed below the vehicle floor.

11. The access ramp of claim 1 wherein said vehicle is a minivan having a floor with upstanding walls and said door is a side-opening door.

* * * * *